J. Burnham.
Land Marker.
N° 70,953. Patented Nov. 19, 1867.
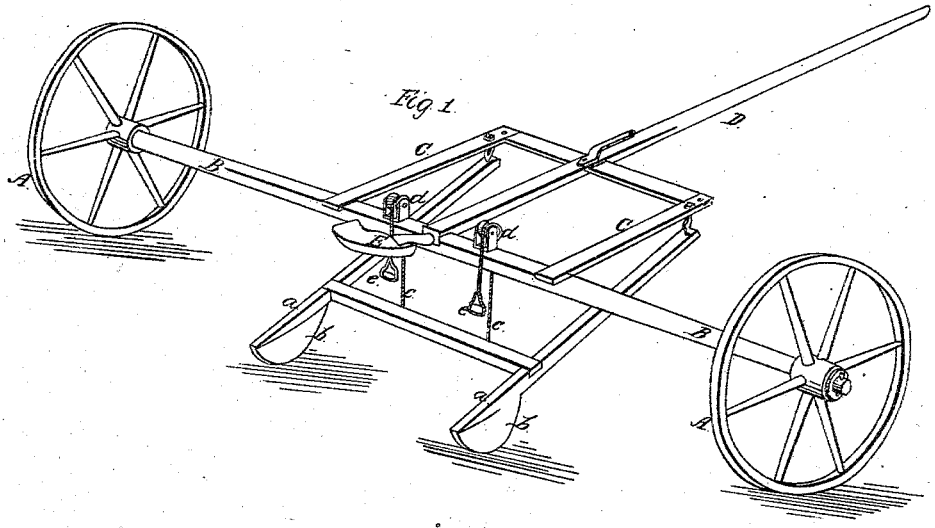
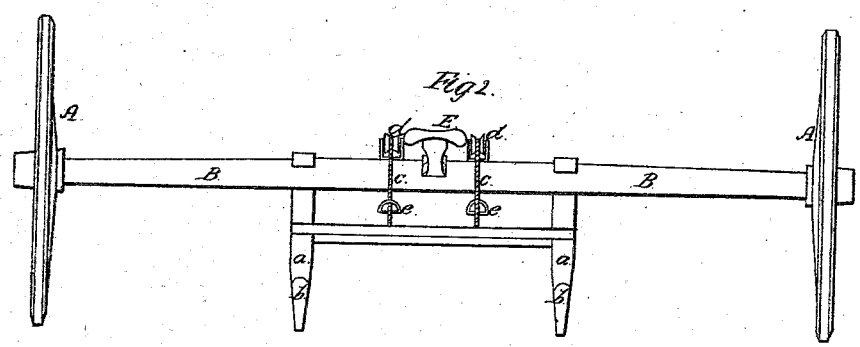
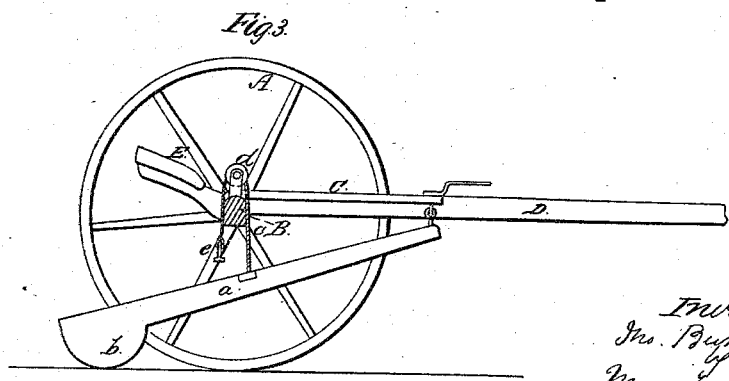
Witnesses.
R. H. Campbell
Edw. Schafer
Inventor
Jno. Burnham
by
Mason, Fenwick & Lawrence

United States Patent Office.

JOHN BURNHAM, OF LA SALLE, ILLINOIS, ASSIGNOR TO HIMSELF AND DAVID L. HOUGH, OF SAME PLACE.

Letters Patent No. 70,953, dated November 19, 1867.

IMPROVEMENT IN MARKER FOR PLANTING CORN.

*The Schedule referred to in these Letters Patent and making part of the same.*

TO ALL WHOM IT MAY CONCERN:

Be it known that I, JOHN BURNHAM, of La Salle, in the county of La Salle, and State of Illinois, have invented a new and improved Marker; and I do hereby declare that the following is a full, clear, and exact description thereof, reference being had to the accompanying drawings, making a part of this specification, in which—

Figure 1 is a perspective view of the marker complete.

Figure 2 is a rear end view of the same.

Figure 3 is a sectional side elevation.

Similar letters of reference indicate corresponding parts in the three figures.

This invention relates to a new and improved machine, which is designed for marking off ground preparatory to distributing corn or other seeds, so that regular lines can be made in the ground for the direction of the person who distributes the seeds.

The nature of my invention consists in the employment of marking-teeth upon the ends of inclined arms, which arms are hinged to an axle that is mounted upon two marking and transporting-wheels, so that, by means of chains and stirrups, a person mounted upon the machine can raise or depress the toothed markers at pleasure, the toothed markers and marking-wheels being so arranged that four marks can be made by the machine at regular distances apart, as will be hereinafter described.

To enable others skilled in the art to understand my invention, I will describe its construction and operation.

In the accompanying drawings, A A represent the two transporting-wheels of the machine, which are applied to an axle, B. To this axle is secured a frame, C, and a draught-pole, D, to the rear end of which latter a driver's seat, E, is applied, upon which the person sits who controls the movements of the machine over the field. The frame C is applied in front of the axle, and in the middle of its length, and to the front of this frame, near its sides, arms *a a* are hinged, which incline backward beneath the axle, and are connected together by a transverse bar, as shown in figs. 1 and 2. Upon the rear extremities of these arms *a a*, marking-teeth *b b* are secured, which have rounded edges, as shown in the drawings, and which are tapered so as to leave a furrow in the ground, over which they are drawn. To the transverse bar, which connects the arms of the markers together, two ropes or chains, *c c*, are suitably attached, which are carried up in front of the axle B, and passed over grooved rollers or pulleys *d d*, and provided with stirrups *e e* upon their hanging ends, into which the driver puts his feet when he desires to raise the teeth *b b* free from the ground. The arrangement of the seat E in the relation to the stirrups *e*, as shown, admits of the driver raising or depressing the marking-teeth with his feet, and leaves his hands free to control his horses. The distance between the two marking-teeth *b b* is equal to the distance between either one of these teeth and the transporting-wheel A which is nearest to it. By thus arranging the wheels A A and marking-teeth *b b*, the said wheels serve as markers also, and leave furrows in the surface of the ground passed over, as indicated in fig. 2.

When this machine is drawn over a harrowed field, there will be four marks or slight furrows left in the ground, two of which are made by the runners or teeth, and two are made by the transporting-wheels. Upon returning, after once passing across a field, one wheel may be run in the mark or furrow nearest the machine; thus a guide will be afforded for running the next marks parallel to those last made, and for keeping the marks at equal distances apart.

Having described my invention, what I claim as new, and desire to secure by Letters Patent, is—

A two-wheel marker which is constructed so as to operate substantially in the manner herein described.

JOHN BURNHAM.

Witnesses:
W. T. MASON,
A. M. KELSEY.